(12) United States Patent
Ueyama

(10) Patent No.: US 6,927,924 B2
(45) Date of Patent: Aug. 9, 2005

(54) IMAGING OPTICAL INSTRUMENT

(75) Inventor: Kenji Ueyama, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 10/971,106

(22) Filed: Oct. 25, 2004

(65) Prior Publication Data

US 2005/0083587 A1 Apr. 21, 2005

Related U.S. Application Data

(62) Division of application No. 10/143,789, filed on May 14, 2002, now Pat. No. 6,816,237.

(30) Foreign Application Priority Data

May 14, 2001 (JP) ........................................ 2001-142585

(51) Int. Cl.[7] .......................... G02B 9/00; G02B 13/02; G06K 9/46; G01J 1/42; H04N 3/02
(52) U.S. Cl. ...................... 359/738; 359/739; 359/740; 359/663; 359/601; 359/368; 359/823; 359/695; 382/207; 250/208.4; 250/237 R; 250/370.08; 348/201; 348/199; 346/107.3; 355/67
(58) Field of Search ................................ 359/738, 739, 359/740, 663, 565, 694, 700, 823, 601, 695, 368, 676; 382/207; 250/208.4, 237 R, 370.08, 332; 348/201, 205, 199; 346/107.3; 355/53, 67

(56) References Cited

U.S. PATENT DOCUMENTS 3,259,733 A * 7/1966 Klaver et al. ................ 382/207
3,365,724 A * 1/1968 Brown et al. ............. 346/107.3
3,500,049 A * 3/1970 Nutz ........................ 250/208.4
3,698,797 A    10/1972 Brown et al.

(Continued)

FOREIGN PATENT DOCUMENTS

| DE | 199 10 725 A1 | 10/1999 |
|---|---|---|
| JP | 53-135096 | 11/1978 |
| JP | 63-108318 | 5/1988 |
| JP | 03-133590 | 6/1991 |
| JP | 04-113185 | 10/1992 |
| JP | 05-192782 | 8/1993 |
| JP | 07-092348 | 4/1995 |
| JP | 9-306023 A | 11/1997 |
| WO | WO 00/14588 A | 3/2000 |

*Primary Examiner*—Loha Ben
(74) *Attorney, Agent, or Firm*—McDermott Will & Emery LLP

(57) ABSTRACT

An imaging optical instrument causes light emitted from a plurality of light sources arranged adjacent an object to image on recording surfaces of a photosensitive or thermosensitive material. The optical instrument includes a two-sided telecentric optical system having a first lens disposed adjacent an entrance end of a lens barrel, and a second lens disposed adjacent an exit end of the lens barrel, and an aperture stop disposed adjacent a meeting point of a rearward focus of the first lens and a forward focus of the second lens. The aperture stop has an aperture formed centrally thereof for allowing passage of beams that should contribute to image formation, and a refracting portion surrounding the aperture for refracting beams that should be intercepted and causing these beams to leave the lens barrel from the exit end thereof.

2 Claims, 5 Drawing Sheets

U.S. PATENT DOCUMENTS

| | | |
|---|---|---|
| 3,884,568 A | 5/1975 | Fritzsch |
| 4,128,752 A | 12/1978 | Gravel |
| 5,161,238 A | 11/1992 | Mehmke |
| 5,177,639 A * | 1/1993 | Kohmoto .................... 359/740 |
| 5,212,589 A | 5/1993 | Goodman |
| 5,276,552 A * | 1/1994 | Kohmoto et al. ........... 359/601 |
| 5,339,123 A | 8/1994 | Soshi et al. |
| 5,343,331 A * | 8/1994 | Kohmoto et al. ........... 359/823 |
| 5,364,493 A | 11/1994 | Hunter, Jr. et al. |
| 5,424,552 A | 6/1995 | Tsuji et al. |
| 5,592,335 A * | 1/1997 | Omi et al. ................... 359/695 |
| 5,638,223 A | 6/1997 | Ikeda |
| 5,691,853 A * | 11/1997 | Miyano ...................... 359/740 |
| 5,955,243 A | 9/1999 | Tanitsu |
| 6,239,923 B1 * | 5/2001 | Takezawa ................... 359/739 |
| 6,560,012 B2 * | 5/2003 | Adachi et al. .............. 359/368 |
| 6,724,546 B2 * | 4/2004 | Nishimae et al. ........... 359/740 |

\* cited by examiner

IMAGING OPTICAL INSTRUMENT

This application is a divisional of application Ser. No. 10/143,789 filed May 14, 2002, now U.S. Pat. No. 6,816,237.

BACKGROUND OF THE INVENTION

1. Field of the Invention

The present invention relates to an imaging optical instrument for imaging light from an object on a recording surface.

2. Description of the Related Art

Generally, such an imaging optical instrument includes an aperture stop disposed in an optical system for limiting beams contributing to image formation, in order to secure excellent imaging performance or to secure a required focal depth. Such an aperture stop is formed of a light-shielding sheet of metal or plastic defining a circular or polygonal aperture. The aperture stop is fixed inside a sealed space defined by lenses and a barrel holding the lenses.

Where, for example, high power lasers are used as light sources to emit light for forming images on a recording surface, light of high energy level enters the optical instrument from the objects. In such a case, the aperture stop is heated to a high temperature as a result of shielding the high energy light.

The heat of the aperture stop reaches the lens barrel by thermal conduction, and may deform the lens barrel locally. Such a deformation disrupts a proper positional relationship between the lenses to lower imaging performance. The heat of the aperture stop filling the lens barrel interior by thermal convection heats up and expands the entire lens barrel. This results in an imaging position shifting along the optical axis. With a further increase in the temperature of the aperture stop, the aperture stop itself may melt or vaporize to lose its light-shielding function. The shielding material may adhere to lens surfaces to lower optical efficiency also.

It is conceivable to deal with this problem by arranging for the aperture stop to be held independently of the lens barrel. Where such a construction is employed, surfaces of the lenses arranged forwardly and rearwardly the aperture stop are exposed to atmosphere outside the lens barrel. Consequently, dust and the like present in the atmosphere could adhere to the lens surfaces to lower optical efficiency.

SUMMARY OF THE INVENTION

The object of the present invention, therefore, is to provide an imaging optical instrument capable of effectively preventing an increase in the temperature of an aperture stop.

The above object is fulfilled, according to the present invention, by an imaging optical instrument for causing light incident at an entrance end of a lens barrel to pass through an aperture stop and thereafter to leave the lens barrel from an exit end thereof, thereby imaging on a recording surface, wherein the aperture stop comprises an optical element having a passage portion formed centrally thereof for allowing passage of beams that should contribute to image formation, and a refracting portion surrounding the passage portion for refracting beams that should be intercepted and causing the beams that should be intercepted to leave the lens barrel from the exit end.

This imaging optical instrument is capable of effectively preventing an increase in the temperature of the aperture stop and lens barrel.

In a preferred embodiment of the invention, the aperture stop comprises an optical element having an aperture formed centrally thereof for allowing passage of beams, that should contribute to image formation, and a refracting portion surrounding the aperture for refracting beams that should be intercepted and causing the beams that should be intercepted to leave the lens barrel from the exit end. That is, the aperture formed in the optical element is used as the passage portion for allowing passage of the beams.

In another preferred embodiment, the aperture stop comprises an optical element having a parallel plate portion formed centrally thereof for allowing passage of beams that should contribute to image formation, and a refracting portion surrounding the parallel plate portion for refracting beams that should be intercepted and causing the beams that should be intercepted to leave the lens barrel from the exit end. That is, the parallel plate portion formed in the optical element is used as the passage portion for allowing passage of the beams.

In another aspect of the invention, there is provided an imaging optical instrument for causing light incident at an entrance end of a lens barrel to pass through an aperture stop and thereafter to leave the lens barrel from an exit end thereof, thereby imaging on a recording surface, wherein the aperture stop comprises an optical element having an aperture formed centrally thereof for allowing passage of beams that should contribute to image formation, and a reflecting portion surrounding the aperture for reflecting beams that should be intercepted and causing the beams that should be intercepted to leave the lens barrel from the entrance end.

In a further aspect of the invention, there is provided an imaging optical instrument for causing light incident at an entrance end of a lens barrel to pass through an aperture stop and thereafter to leave the lens barrel from an exit end thereof, thereby imaging on a recording surface, wherein the aperture stop comprises a plurality of light-shielding plates arranged at predetermined intervals along an optical axis of the lens barrel and defining apertures with diameters thereof varying stepwise, the lens barrel defining a vent hole adjacent the aperture stop.

Other features and advantages of the present invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
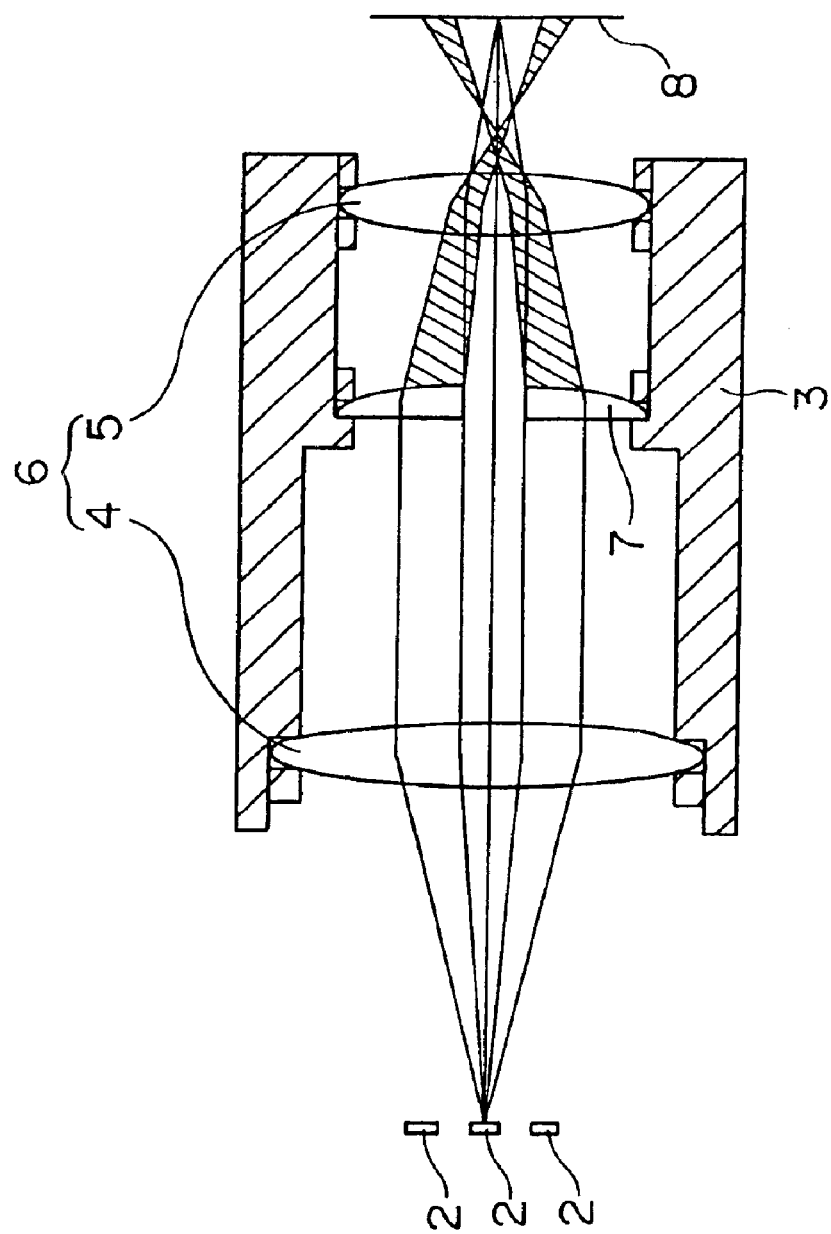
FIG. 1 is a sectional side view of an imaging optical instrument in a first embodiment of the invention.

An embodiment of the present invention will be described hereinafter with reference to the drawings. FIG. 1 is a sectional side view of an imaging optical instrument in a first embodiment of the invention.

This imaging optical instrument is designed for causing light emitted from a plurality of light sources 2 arranged adjacent an object to image on a recording surfaces 8 of a photosensitive or thermosensitive material. The imaging optical instrument includes a lens barrel 3 having a lens 4 disposed adjacent an entrance end of the lens barrel 3 and a lens 5 disposed adjacent an exit end of the lens barrel 3 to act as a two-sided telecentric optical system 6, and an aperture stop 7. This imaging optical instrument is used, for example, in an image recording apparatus that records images by scanning the photosensitive or thermosensitive material with beams modulated by image signals.

The light sources 2 are formed of semiconductor lasers or light emitting diodes, for example. Further, the light sources 2 may be in the form of ends of a plurality of optical fibers connected to semiconductor lasers or light emitting diodes, or a group of openings illuminated by semiconductor lasers or light emitting diodes. These light sources 2 are arranged to emit light having intensity gravities running parallel to one another, and preferably parallel to the optical axis of the two-sided telecentric optical system 6.

While a plurality of light sources 2 are used in the above embodiment, this is not absolutely necessary. A single light source 2 may be used instead. The two-sided telecentric optical system 6 includes, in the simplest form, two positive lenses 4 and 5 spaced from each other by a sum of focal lengths thereof. The arrangement of the light sources 2 is magnified or reduced by the two-sided telecentric optical system 6 into an arrangement of luminous points for recording images with a desired resolution on the recording surface 8. Since the principal rays in the beams emitted from the light sources 2 are parallel to one another, the arrangement of luminous points remains constant even when the recording surface 8 deviates forward or rearward from an imaging plane. Thus, images may be recorded with high precision.

The aperture stop 7 is disposed adjacent a meeting point of a rearward focus of the lens 4 and a forward focus of the lens 5.

Figure 2:
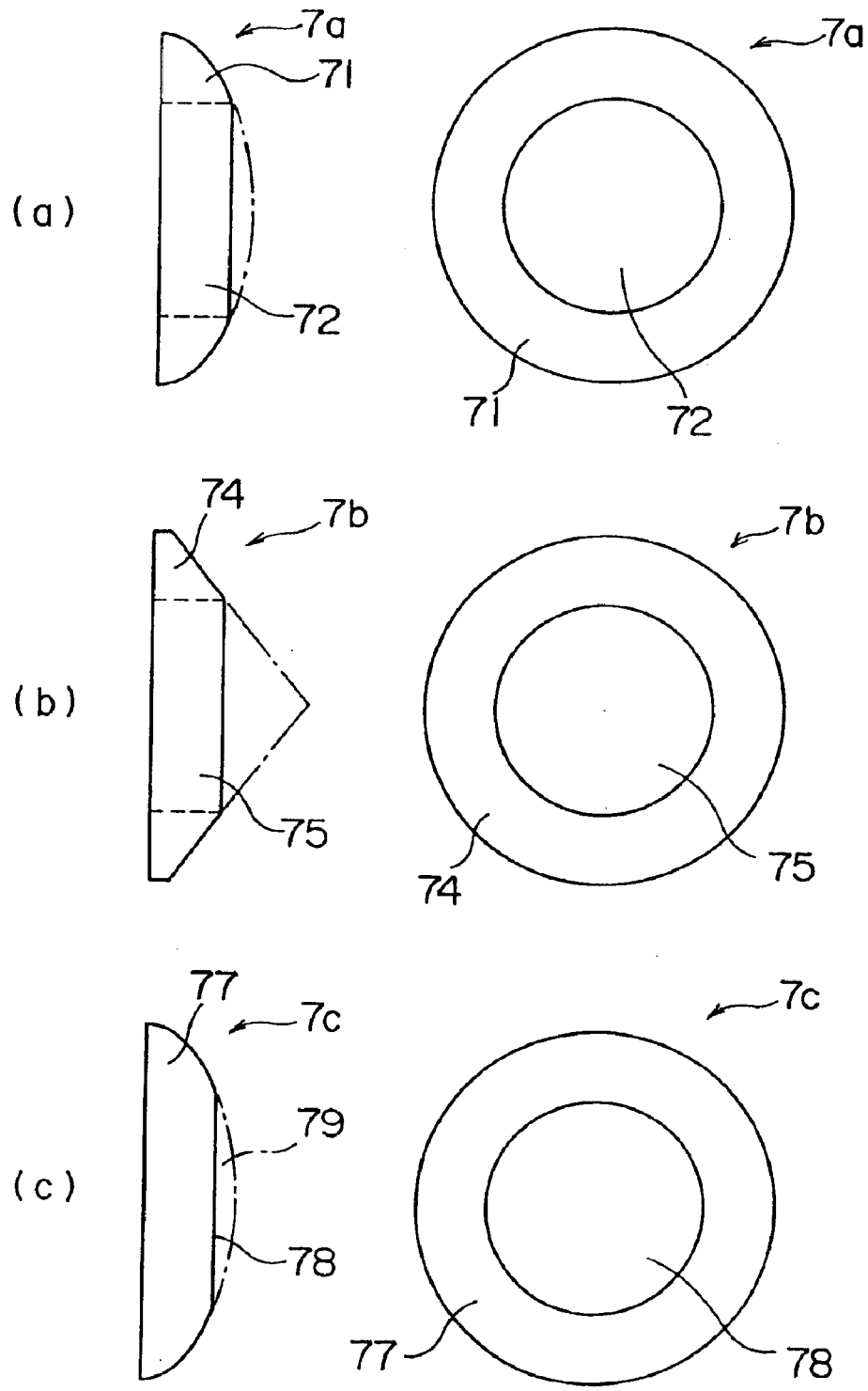
FIG. 2 is an explanatory view of aperture stops.

FIG. 2 is an explanatory view schematically showing various aperture stops 7a, 7b and 7c (which may be referred to collectively as "aperture stop 7"). Each of FIGS. 2(a), 2(b) and 2(c) includes a side view at left and a front view at right. FIGS. 2(a), 2(b) and 2(c) show various configurations with exaggeration.

The aperture stop 7 shown in FIG. 1 corresponds to the aperture stop 7a shown in FIG. 2(a). The aperture stop 7a is formed by drilling a plano-convex lens as shown in phantom in the side view at the left of FIG. 2(a). The aperture stop 7a has an aperture 72 formed centrally thereof to act as a passage of light, and a refracting portion 71 surrounding the aperture 72 to refract the light. The aperture 72 has an inside diameter corresponding to an aperture diameter required of the aperture stop 7a. This aperture diameter determines an NA(number of apertures) of the beams used in recording images. The aperture diameter is determined by taking optical efficiency and focal depth into account.

In the imaging optical instrument having the above construction, of the beams emitted from the light sources 2, the parts that should contribute to image formation pass straight through the aperture 72 of the aperture stop 7a. Consequently, the two-sided telecentric optical system 6 causes these beams to form images of the light sources 2 on the recording surface 8.

On the other hand, of the beams emitted from the light sources 2, the parts that should be intercepted(i.e. the parts that should not contribute to image formation) are refracted by the refracting portion 71 of the aperture stop 7a. As shown in hatching in FIG. 1, such parts of the beams, after exiting the lens barrel 3 reach around the imaging points which are formed by the beams having passed through the aperture 72 of the aperture stop 7a without forming images and without being condensed. By appropriately shaping the refracting portion 71 of the aperture stop 7a, the density of light energy in these areas may be made far less than the density of light energy at the imaging point on the recording surface 8 of the light having passed through the aperture 72 of the aperture stop 7a. Thus, an image is recorded without being affected by the light reaching the areas around the imaging point without forming images and without being condensed.

The aperture stop 7a allows the unwanted light to leave the lens barrel 3 from the exit end thereof instead of intercepting such unwanted light. Consequently, this imaging optical instrument effectively avoids the generation of heat occurring in the prior art.

The shape of refracting portion 71 of the aperture stop 7a (i.e. the shape of the plano-convex lens used as stock) must be such that the beams thereby refracted do not impinge on inner walls of the lens barrel 3, but reach the areas around the imaging point on the recording surface 8 without forming images and without being condensed. Where the refracting portion 71 has an excessively low level of refractive power, the beams having passed through the refracting portion 71 would reach small areas around the imaging point on the recording surface 8. The density of light energy in these areas is not sufficiently lowered, thereby to produce an adverse effect on image recording. A permissible level of light energy of the beams passing through the refracting portion 71 for producing no adverse effect on image recording is dependent chiefly on the characteristics of a recording medium set to the recording surface 8. On the other hand, where the refracting portion 71 has an excessively high level of refractive power, the beams having passed through the refracting portion 71 would impinge on the inner walls of the lens barrel 3 to be absorbed and converted to heat by the inner walls. This gives rise to such problems as deterioration in imaging performance and displacement of an imaging position.

A high degree of profile irregularity is not required of the refracting portion 71 of the aperture stop 7a, which allows the aperture stop 7a to be manufactured by using an inexpensive plano-convex lens or the like. At this time, preferably, a large aberration is provided in order to reduce the energy density of the beams reaching areas around an imaging point without forming images and without being condensed.

The above aperture stop 7a may be replaced by the aperture stop 7b shown in FIG. 2(b) or the aperture stop 7c shown in FIG. 2(c).

The aperture stop 7b shown in FIG. 2(b) is formed by drilling a cone prism as shown in phantom in the side view at the left of FIG. 2(b). The aperture stop 7b has an aperture 75 formed centrally thereof, and a refracting portion 74 surrounding the aperture 75 to refract the light. The aperture 75 has an inside diameter corresponding to an aperture diameter required of the aperture stop 7b.

When this aperture stop 7b is used, as when the above aperture stop 7a is used, of the beams emitted from the light sources 2, the parts that should contribute to image formation pass straight through the aperture 75 of the aperture stop 7b. Consequently, the two-sided telecentric optical system 6 causes these beams to form images of the light sources 2 on the recording surface 8. On the other hand, of the beams emitted from the light sources 2, the parts that should be intercepted are refracted by the refracting portion 74 of the aperture stop 7b. Such parts of the beams reach areas around the imaging point without forming images and without being condensed.

In the two-sided telecentric optical system 6 shown in FIG. 1, the beams are in the state of nearly parallel beams where the aperture stop 7 is installed. Thus, when the aperture stop 7b obtained by drilling a cone prism is used, variations in the incident angle and exit angle may be reduced. This facilitates optimization of an antireflection coating usually applied to this type of optical element, and assures an improved antireflection effect. Consequently, heat generation adjacent the aperture stop 7b may be more effectively suppressed than where the foregoing aperture stop 7a is used.

The aperture stop 7c shown in FIG. 2(c) is formed by cutting and polishing a surface area 79 of a plano-convex lens as shown in phantom in the side view at the left FIG. 2(c). The aperture stop 7c has a parallel plate portion 78 formed centrally thereof to act as a light passage, and a refracting portion 77 surrounding the parallel plate portion 78 to refract the light. The parallel plate portion 78 has a diameter corresponding to an aperture diameter required of the aperture stop 7c.

When this aperture stop 7c is used, as when the above aperture stop 7a or 7b is used, of the beams emitted from the light sources 2, the parts that should contribute to image formation pass straight through the parallel plate portion 78 of the aperture stop 7c. Consequently, the two-sided telecentric optical system 6 causes these beams to form images of the light sources 2 on the recording surface 8. On the other hand, of the beams emitted from the light sources 2, the parts that should be intercepted are refracted by the refracting portion 77 of the aperture stop 7c. Such parts of the beams reach areas around the imaging point without forming images and without being condensed.

With the foregoing aperture stops 7a and 7b, parts of the beams emitted from light sources 2 arranged off the optical axis could enter the refracting portions 71 and 74 through inner walls of apertures 72 and 75 to be absorbed, scattered or reflected. This would cause a temperature increase adjacent the aperture stops 7a and 7b, or lower imaging performance because of flares. The aperture stop 7c is free from such problems. However, when this aperture stop 7c is used, the entire system including the parallel plate portion 78 must be designed with aberration corrections.

In the above embodiment, a plano-convex lens or prism is used for the aperture stop 7. In place of the plano-convex lens or prism, a flattened lens such as a Fresnel lens or graded index lens may be used. Instead of the lens, a diffracting optical element may be used.

Figure 3:
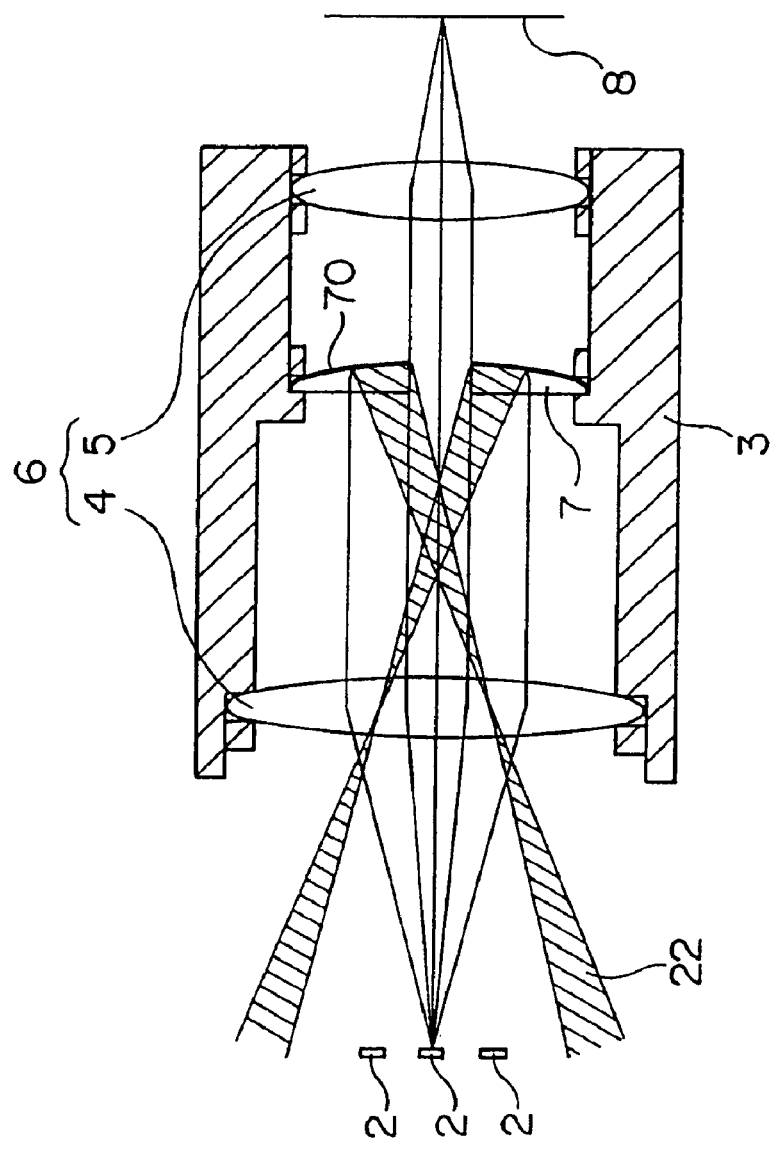
FIG. 3 is a sectional side view of an imaging optical instrument in a second embodiment of the invention.

Another embodiment of the invention will be described next. FIG. 3 is a sectional side view of an imaging optical instrument in a second embodiment. Like reference numerals are used to identify like parts which are the same as in the first embodiment and will not be described again.

The foregoing imaging optical instrument in the first embodiment refracts the beams that should be intercepted and allows these beams to leave the lens barrel 3 from the exit end thereof. The imaging optical instrument in the second embodiment reflects the beams that should be intercepted and allows these beams to leave the lens barrel 3 from the entrance end thereof.

This imaging optical instrument employs an aperture stop 7 similar to the aperture stop 7a shown in FIG. 2(a), and formed of a plano-convex lens having a central aperture, but with a reflective coating 70 applied to the convex surface thereof(opposed to the recording surface 8 shown in FIG. 3). The aperture of this aperture stop 7 has an inside diameter corresponding to the aperture diameter required of the aperture stop 7.

In the imaging optical instrument in the second embodiment, of the beams emitted from the light sources 2, the parts that should contribute to image formation pass straight through the aperture of the aperture stop 7. Consequently, the two-sided telecentric optical system 6 causes these beams to form images of the light sources 2 on the recording surface 8.

On the other hand, of the beams emitted from the light sources 2, the parts that should be intercepted are reflected by the reflective coating 70 on the aperture stop 7. As shown in hatching in FIG. 3, such parts of the beams leave the lens barrel 3 from the entrance end thereof.

In the imaging optical instrument in the second embodiment, as in the imaging optical instrument in the first embodiment, the aperture stop 7 allows the unwanted light to leave the lens barrel 3, from the entrance end thereof in this embodiment, instead of intercepting such light. Consequently, this imaging optical instrument effectively avoids the generation of heat occurring in the prior art.

The shape of reflective coating 70 on the aperture stop 7 (i.e. the shape of the plano-convex lens used as stock) must be such that the beams thereby reflected do not impinge on the inner walls of the lens barrel 3, but exit from the entrance end. In this embodiment, a plano-convex lens is used as stock for forming the aperture stop 7 to determine the shape of reflective coating 70. An element other than a lens may be used. Instead of using the plano-convex lens with reflective coating 70, a plane mirror defining a central opening may be used.

Figure 4:
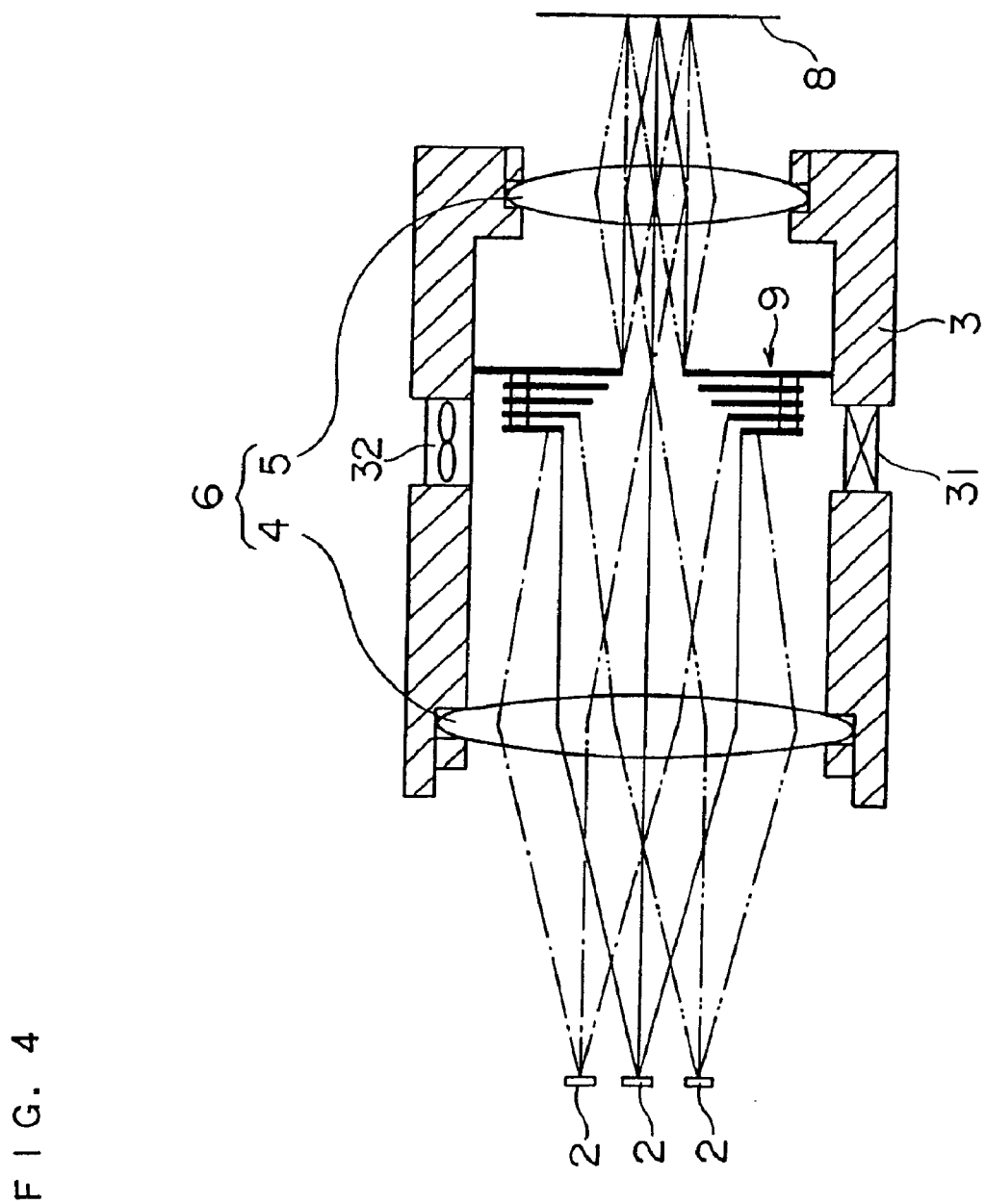
FIG. 4 is a sectional side view of an imaging optical instrument in a third embodiment of the invention.
Figure 5:
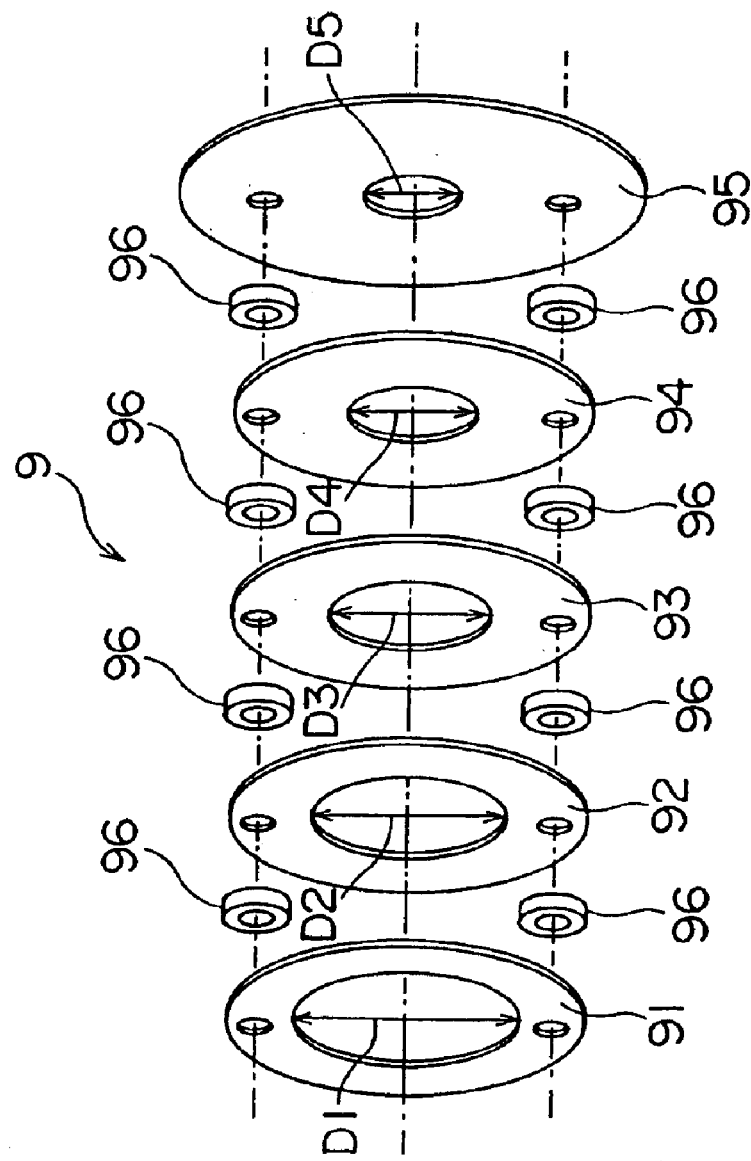
FIG. 5 is an exploded perspective view of an aperture stop in the third embodiment.

A further embodiment of the invention will be described next. FIG. 4 is a sectional side view of an imaging optical instrument in a third embodiment. FIG. 5 is an exploded perspective view of an aperture stop in the third embodiment. Like reference numerals are used to identify like parts which are the same as in the first and second embodiments and will not be described again.

The imaging optical instruments in the first and second embodiments described hereinbefore cause the beams that should be intercepted to leave the lens barrel 3 from the exit or entrance end thereof. The imaging optical instrument in the third embodiment is constructed to shield and absorb the beams that should be intercepted.

Specifically, an aperture stop 9 employed in the imaging optical instrument in the third embodiment has five thin light-shielding plates 91, 92, 93, 94 and 95 arranged, with spacers 96 in between, along the optical axis of the lens barrel 3. The five light-shielding plates 91, 92, 93, 94 and 95 define apertures having aperture diameters D1, D2, D3, D4 and D5, respectively. The aperture diameters D1, D2, D3, D4 and D5 are progressively smaller from the light-shielding plate 91 to the light-shielding plate 95. The diameter D5 of the aperture in the light-shielding plate 95 corresponds to an aperture diameter required of the aperture stop 9.

The lens barrel 3 has an opening formed adjacent the aperture stop 7, with a filter 31 fitted in the opening for removing foreign matters. The lens barrel 3 has a further opening formed in a position opposed to the above opening, with an exhaust fan 32 fitted therein.

With the aperture stop 9 in this embodiment, each of the light-shielding plates 91, 92, 93, 94 and 95 bears its share in shielding the beams emitted from the light sources 2. This effectively avoids a sharp increase in the temperature of the light-shielding plates 91, 92, 93, 94 and 95. The light-shielding plates 91, 92, 93, 94 and 95 are arranged with the spacers 96 in between, and these spacers 96 have a heat radiating effect comparable to that of heat radiating fins. Thus, the light-shielding plates 91, 92, 93, 94 and 95 are prevented from being heated to a high temperature.

Air ascending in the lens barrel 3 as a result of heat radiation from the light-shielding plates 91, 92, 93, 94 and 95 is discharged from the lens barrel 3 by the exhaust fan 32. Fresh air is supplied into the lens barrel 3 through the filter 31 that removes foreign matters. This prevents the interior of the lens barrel 3 from becoming heated to a high temperature. The filter 31 for removing foreign matters effectively prevents dust and the like from entering the lens barrel 3.

In each of the embodiments described hereinbefore, the imaging optical instrument according to the invention is applied to an image recording apparatus. However, the imaging optical instrument according to the invention is not limited to such application.

The present invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2001-142585 filed in the Japanese Patent Office on May 14, 2001, the entire disclosure of which is incorporated herein by reference.

What is claimed is:

1. An imaging optical instrument for causing light incident at an entrance end of a lens barrel to pass through an aperture stop and thereafter to leave the lens barrel from an exit end thereof, thereby imaging on a recording surface, wherein said aperture stop comprises an optical element having an aperture formed centrally thereof for allowing passage of beams that should contribute to image formation, and a reflecting portion surrounding said aperture for reflecting beams that should be intercepted and causing said beams that should be intercepted to leave said lens barrel from said entrance end.

2. An imaging optical instrument as defined in claim 1, further comprising a two-sided telecentric optical system including a first lens disposed adjacent said entrance end of said lens barrel, and a second lens disposed adjacent said exit end of said lens barrel, said aperture stop being disposed adjacent a meeting point of a rearward focus of the first lens and a forward focus of the second lens.

* * * * *